United States Patent [19]

Banford et al.

[11] Patent Number: 4,974,338

[45] Date of Patent: Dec. 4, 1990

[54] DRYING PROCESS

[75] Inventors: Jonathan Banford; William Brander, both of Stockton on Tees, England

[73] Assignee: Tioxide Group, PLC, London, England

[21] Appl. No.: 184,795

[22] Filed: Apr. 22, 1988

[30] Foreign Application Priority Data

May 21, 1987 [GB] United Kingdom ............... 8712074

[51] Int. Cl.$^5$ ............................................. F26B 3/04
[52] U.S. Cl. ...................................... 34/31; 34/36
[58] Field of Search .................. 34/36, 30, 13, 31; 159/16.1, 47.1

[56] References Cited

U.S. PATENT DOCUMENTS

| | | |
|---|---|---|
| 3,591,928 | 7/1971 | Nara . |
| 3,599,344 | 8/1971 | Nara . |
| 4,092,784 | 6/1978 | Dietrich et al. ............... 34/36 X |
| 4,310,973 | 1/1982 | King . |
| 4,565,014 | 1/1986 | Doonan ................................ 34/36 |

FOREIGN PATENT DOCUMENTS

| | | |
|---|---|---|
| 0000524A1 | 2/1979 | European Pat. Off. . |
| 0177820A2 | 4/1986 | European Pat. Off. . |
| 0211298A2 | 2/1987 | European Pat. Off. . |
| 1232547 | 5/1971 | United Kingdom . |
| 1242023 | 8/1971 | United Kingdom . |
| 1257967 | 12/1971 | United Kingdom . |
| 1491011 | 11/1977 | United Kingdom . |
| 1548294 | 7/1979 | United Kingdom . |

Primary Examiner—Henry A. Bennet
Attorney, Agent, or Firm—Banner, Birch, McKie & Beckett

[57] ABSTRACT

When it has been attempted to dry wet polymeric particles in hot air at up to 100° C. it has tended to produce discoloration in the product, introduce aggregates into the product, reduce the dispersibility of the product and reduce the integrity of the surface of the particles. A process of drying has now been developed which comprises heating to an elevated temperature the wet particles in an atomsphere substantially free of oxygen gas so that substantially all of the moisture is removed from association with said particles and under such conditions of time and temperature that any substantial deterioration of said particles is minimized. Preferably the atmosphere is of nitrogen.

15 Claims, No Drawings

DRYING PROCESS

This invention relates to a drying process and particularly to a process of drying wet polymeric beads or particles which usually, but not invariably, are vesiculated.

According to the present invention a process of drying comprises heating to an elevated temperature wet particles of a polymeric material in an atmosphere substantially free of oxygen gas so that substantially all of the moisture is removed from association with said particles and under such conditions of time and temperature that any substantial deterioration of said particles is minimised.

Hitherto it has been known to attempt to dry wet polymeric particles in hot air, at temperatures of from 94° C. to 110° C. Unfortunately this drying process has at the higher temperature of 110° C. tended to produce discolouration in the product, introduce aggregates into the product, reduce the dispersibility of the product and reduce the integrity of the surface of the particles. Drying at the lower temperature of 94° C. has tended to reduce the integrity of the surface of the particles somewhat less but has also increased the drying time inordinately when compared to the time of drying at 110° C.

Consequently there has been a requirement for an improved drying process.

The process of the present invention is such an improved process and even so simple it has been found surprisingly that drying in an atmosphere substantially free of oxygen gas overcomes many, if not all, of the previous disadvantages. The improvement in the integrity of the surface of the particles in their ability to resist penetration by a solvent is quite unexpected and amazing.

In essence this invention is a process of drying wet particles of polymeric material, usually so-called microspheres or other small sized particles in aqueous suspension or wetted with water. The drying takes place at an elevated temperature in said atmosphere. The improvement obtained in the integrity of the surface of the particle obtained by drying in said atmosphere as compared with drying in air is surprising and unexpected.

Any atmosphere substantially free of oxygen gas can be used but the gas which is the most abundant and cheapest is preferred provided the effect of drying is not substantially less than in another. Typically inert gases such as the noble gases, e.g. argon or helium, or other inert gases, such as nitrogen, can be employed. Other gases such as carbon dioxide can be employed if desired. Naturally, mixtures of two or more gases which would be suitable if used singly can be employed together.

Since it is an object of the process of the invention to minimise any possible discolouration in the particulate product and any other damage, naturally, drying will take place at a temperature below that at which such deterioration occurs. For products formed from a possible wide range of differing polymeric materials the maximum temperature usually will be governed by such factors as the melting point of the polymeric material, the first softening point, the charring point, the discolouration temperature and others. However generally speaking the temperature chosen and the time of drying are interrelated with the exact manner of effecting the drying process and the various combinations acceptable for satisfactory working being easily ascertainable.

The conditions required will also depend on the amount of water to be removed in the process. Clearly for a given chosen method of drying, different conditions of temperature and time will be required for a material including a greater amount of water than for a material having less water.

The particular method of drying will also affect the parameters of the drying process. The process can be operated in any suitable equipment, for instance by heating the wet product in an oven or other chamber in an atmosphere of the heated gas or in a trough, ribbon or band drier in an atmosphere of the heated gas or in a fluidised bed drier fluidised by the heated gas or in a spray drier in which perhaps the most efficient removal of water will be effected. The wet product can also be partially dried in one form of equipment before being dried completely in another, if so desired.

The process of the present invention is designed particularly to be used to dry wet polymer particles such as vesiculated beads or vesiculated polymer granules or beads or particles encapsulating insoluble particulate matter or droplets of less volatile liquids. These granules are formed of a polymeric material and contain one or more vesicles the walls of which vesicles are provided by the polymer. Preferably the granules are substantially spherical and the vesicles occupy from 5% to 95% of the total volume of the granules. Most preferably the vesicles occupy from 20% to 80% of the volume of the granules.

The granules can have a wide range of sizes and can for instance be up to 100 microns in volume mean diameter or even larger, up to 250 microns in volume mean diameter. Very small granules can be dried by the process of the invention. The granules can have a volume mean diameter of as low as 0.5 micron, or even lower, as low as 0.2 micron. Most typically, the granules will have a volume mean diameter of from 5 microns to 20 microns.

Typically the vesicles in the preferred granules will be substantially spherical in shape and have a diameter less than 20 microns and preferably less than 5 microns depending on the size of the granule.

The vesicles on drying may become filled with the gas or alternatively the vesicles in the wet particles may contain a pigment or liquid material or other solid or gaseous material.

If desired the polymer may be pigmented but in order to maintain strength it is desirable that excess concentration be avoided.

Generally speaking the nature of the polymer is not critical provided due regard is taken of the final use of the dry granules or particles. The polymer can be a polyester, obtained by condensation of a polycarboxylic acid and a polyol, a polyester amide, a polyurethane, a urea-aldehyde resin, a cellulosic ester or any other suitable material. Preferably the polymer is an unsaturated polyester resin cross-linked with an unsaturated monomer.

Other types of polymer particles which may be dried by the process of the present invention are those known as water-insoluble core/sheath polymer particles and particularly those having a single vesicle per particle. In such particles the core is formed of polymeric material which will swell on contact with an appropriate substance and the sheath is formed of another polymeric material which is permeable to the substance required to react with the core. The particles may be pigmented if desired.

The invention is of particular value when the drying process forms a final stage in the manufacturing process for the polymer particles. It is frequently an integral part of a manufacturing operation of polymer particles that they exist finally in aqueous dispersion and hitherto the product in this form, albeit after filtering, has been transported to the manufacturer of a paint or other product. Generally the form of being dispersed in water would restrict their usage to water -borne paints etc. In solvent-based paint systems or in systems with only a small water content, particles wholly or substantially free of water are required. Clearly the drying process of the invention in permitting drying of this aqueous dispersion improves considerably the ease of handling, transportation and use.

As will be seen from the description of the various types of polymers which can be used to form the particles the drying process can be carried out at widely differing temperatures. Depending on the precise constitution of the polymer it has been found advantageous to dry particles usually at temperatures within the range 90° C. to 140° C. and preferably within the range 95° C. to 125° C.

Usually before drying it is advantageous to remove as much water as is possible by any suitable means, such as filtration, centrifugation or settlement, to minimise the use of heat energy. In the most preferred processes the wet polymer particle dispersion to be dried will comprise no more than 90% by weight of water but on a volume basis the amount of water exterior of the particles will generally speaking not exceed 60%. At this stage the particles, if vesiculated, may contain water in the vesicles which together with that wetting the surface of the particles is removed by the drying operation and usually replaced with the gas.

The invention is illustrated in the following Examples.

EXAMPLE 1

The bead slurry used in this Example consisted of an aqueous slurry of vesiculated polyester beads, with a mean diameter of 10 microns and 95% by volume with a diameter below 20 microns. The beads consisted of an unsaturated polyester resin cured by reacting it with 60% by weight of styrene monomer, with water-filled vesicles making up 75% of the bead volume. The slurry contained 15.7% by weight of beads, and 3.2% of poly(-vinyl alcohol) based on the weight of beads present.

To 4000 parts of slurry were added 15 parts of 10% ammonia solution and 40 parts of a 5% solution of the flocculating agent. This flocculating agent is the monoacetate salt of a diamine derived from a fatty acid. The slurry was then heated to 70° C. and stirred until flocculation occurred. The batch was filtered through a conventional vacuum filter, and was washed with clean water until no further poly(vinyl alcohol) could be detected in the filtrate. Testing for poly(vinyl alcohol) consisted of mixing a sample of the filtrate with ten times its volume of acetone, whereupon any poly(vinyl alcohol) present is precipitated as a white turbidity. The resulting filter cake contained 18.4% by weight of beads solids.

2 kg of filter cake was broken up and placed on a tray in an oven equipped with a thermostat and able to be flushed through with nitrogen gas. The cake was then heated to 110° C. in an atmosphere of nitrogen for 16 hours, after which time no further weight loss could be detected.

The dried beads formed a soft, friable white mass, which could be brushed through a sieve of aperture 106 microns without leaving a residue. The resulting white powder was tested by incorporation into a polyvinyl chloride plastisol coil coating system. The beads dispersed rapidly and no aggregates were visible in the cured film, which had a high brightness and only a faintly yellowish tone.

The integrity of the bead surface was tested by mixing the beads with white spirit. They immediately floated to the surface and remained buoyant, and therefore presumably impenetrated by the solvent, for a period in excess of four weeks.

EXAMPLE 2

2 kg of filter cake, of the same type as used in Example 1, was dried in the same manner as in Example 1, save that the heating at 110° C. took place in air.

Although drying had taken approximately the same time as in Example 1, the dried bead cake had a noticeably yellow-brown tinge, and there was a firm crust on the material. The dried cake was far harder to break down to powder, grinding in a pestle and mortar being necessary to give material which would brush through a sieve of aperture 106 microns. The resulting off-white powder incorporated poorly into a PVC plastisol system, which, when cured, had significant numbers of visible aggregates present. It also exhibited a definite yellowish tinge.

While the beads floated initially when mixed with white spirit, sufficient solvent penetration had occurred in three weeks to cause them to sink.

EXAMPLE 3

2 kg of filter cake, of the same type as used in Example 1, was dried in the same manner as in Example 1, except that the heating took place in air and was at 94° C.

Approximately two weeks were required for the drying process to be completed. The dried beads formed a fairly soft and friable white mass, which could be brushed through a sieve of aperture of 106 microns without leaving a significant residue. The resulting powder incorporated rapidly into a PVC plastisol system, with no aggregates visible in the cured film, which had a high brightness and only a faint yellowish tone.

The dried beads were mixed with white spirit, and floated to the surface, initially. Within one week, sufficient solvent penetration had occurred to cause them to sink.

EXAMPLE 4

½ kg of filter cake, of the same type as used in Example 1, was dried in the same manner as in Example 1, except that the heating at 110° C. took place in an atmosphere of argon.

Drying took approximately the same time as in Example 1. and the dried beads formed a soft, friable, white mass, which brushed through a sieve of aperture 106 microns without leaving a residue. The resulting white powder incorporated rapidly into a PVC plastisol system, with no aggregates visible in the cured film, which had a high brightness and only a faint yellowish tone.

The dried beads were mixed with white spirit, and remained buoyant for a period in excess of four weeks.

EXAMPLE 5

½ kg of filter cake, of the same type as used in Example 1, was dried in the same manner as in Example 1, except that the heating at 110° C. took place in an atmosphere of carbon dioxide.

Drying took approximately the same time as in Example 1, and the dried beads formed a soft, friable, white mass, which brushed through a sieve of aperture 106 microns without leaving a residue. The dry beads were mixed with white spirit, and remained buoyant for a period in excess of four weeks.

It would be expected that the dry beads could be incorporated easily into a PVC plastisol film as in Example 1, with similar results.

It is clear from the results obtained that the process of the invention results in a dry product having greater integrity when compared with that dried in air.

We claim:

1. A process of drying which comprises heating to an elevated temperature wet particles of a polymeric material in an atmosphere substantially free of oxygen gas so that substantially all of the moisture is removed from association with said particles and under such conditions of time and temperature that any substantial deterioration of said particles is minimised, wherein said particles have a volume mean diameter of from 0.2 microns to 250 microns, and further wherein said particles contain one or more vesicles, the walls of which vesicles are provided by the polymer.

2. A process according to claim 1 wherein the atmosphere is selected from the class consisting of inert gases and carbon dioxide.

3. A process according to claim 1 where the atmosphere is nitrogen.

4. A process according to claim 1 wherein the particles are heated at a temperature within the range 90° C. to 140° C.

5. A process according to claim 1 wherein the particles are composed of an unsaturated polyester resin crosslinked with a unsaturated monomer.

6. A process according to claim 1 wherein the particles are water-insoluble core/sheath polymer particles.

7. A process according to claim 1 wherein vesicles occupy 5% to 95% of the total volume of the particles.

8. A process according to claim 1 wherein the particles are initially in the form of an aqueous slurry.

9. A process according to claim 1 wherein the particles are partially dewatered prior to heating.

10. A process according to claim 1 wherein the wet polymer particle dispersion to be dried comprises no more than 90% by weight water.

11. A process according to claim 1 wherein the water exterior of the particles comprises no more than 60% of the volume of the material to be dried.

12. A process according to claim 1 wherein the particles are heated in a fluidised bed drier.

13. A process according to claim 1 wherein the particles are partially dried in one drier before being dried completely in another.

14. A process according to claim 1 wherein the particles encapsulate insoluble particulate matter or droplets of less volatile liquids.

15. Dry polymeric particles when produced by a process according to claim 1.

* * * * *

UNITED STATES PATENT AND TRADEMARK OFFICE
CERTIFICATE OF CORRECTION

PATENT NO. : 4,974,338

DATED : December 4, 1990

INVENTOR(S) : Jonathan Banford et al.

It is certified that error appears in the above-identified patent and that said Letters Patent is hereby corrected as shown below:

IN THE ABSTRACT

At line 2, "100°C" should read -- 110°C --.

Signed and Sealed this

Fourth Day of August, 1992

Attest:

DOUGLAS B. COMER

Attesting Officer

Acting Commissioner of Patents and Trademarks